Figure 1:
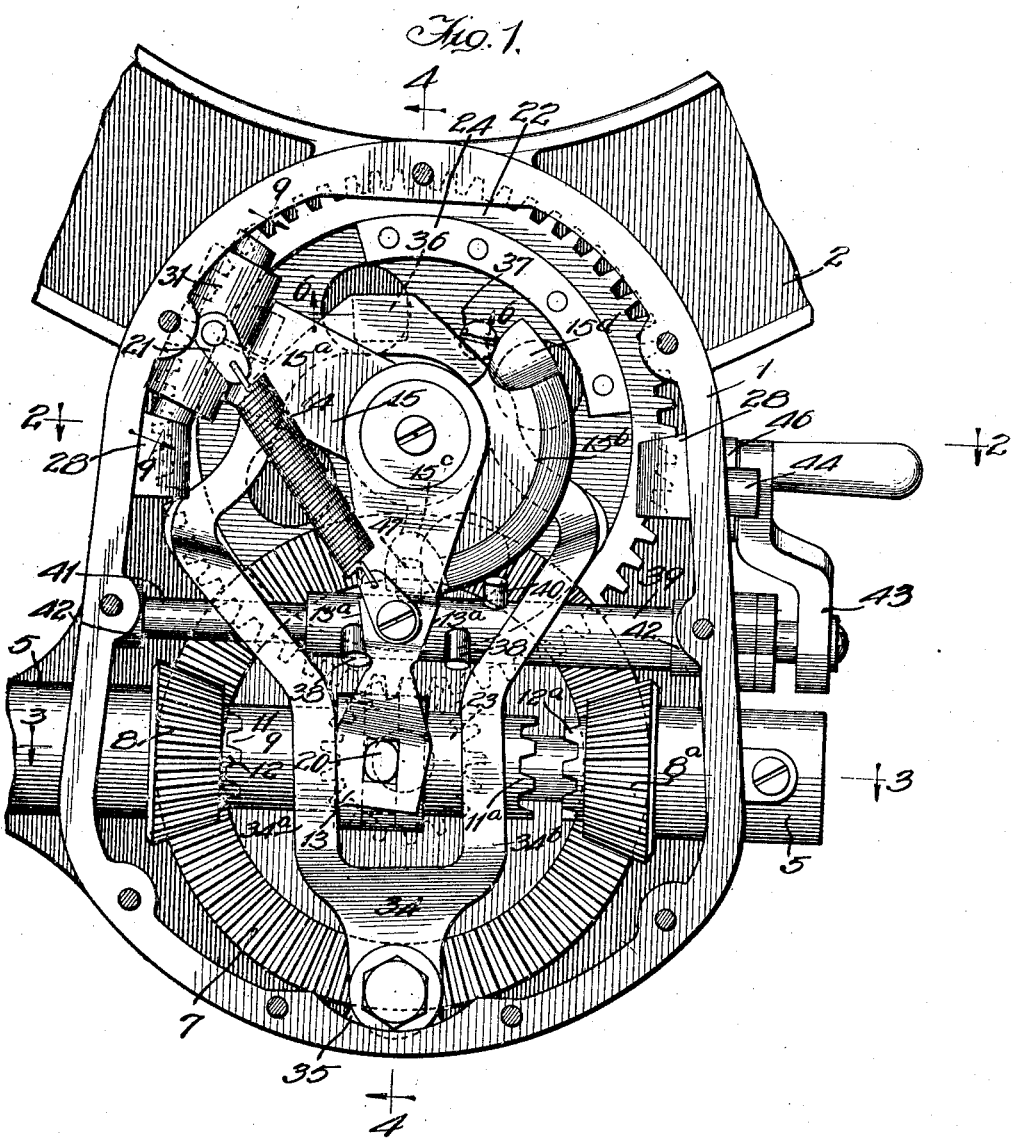

R. S. CORLETT.
AUTOMATIC REVERSING MECHANISM.
APPLICATION FILED JULY 1, 1918.

1,358,295.

Patented Nov. 9, 1920.
4 SHEETS—SHEET 1.

Witnesses:
W. F. Kilroy
Harry R. L. White

Inventor:
Robert S. Corlett
By Miller Chadahl & Tasker
Att'ys

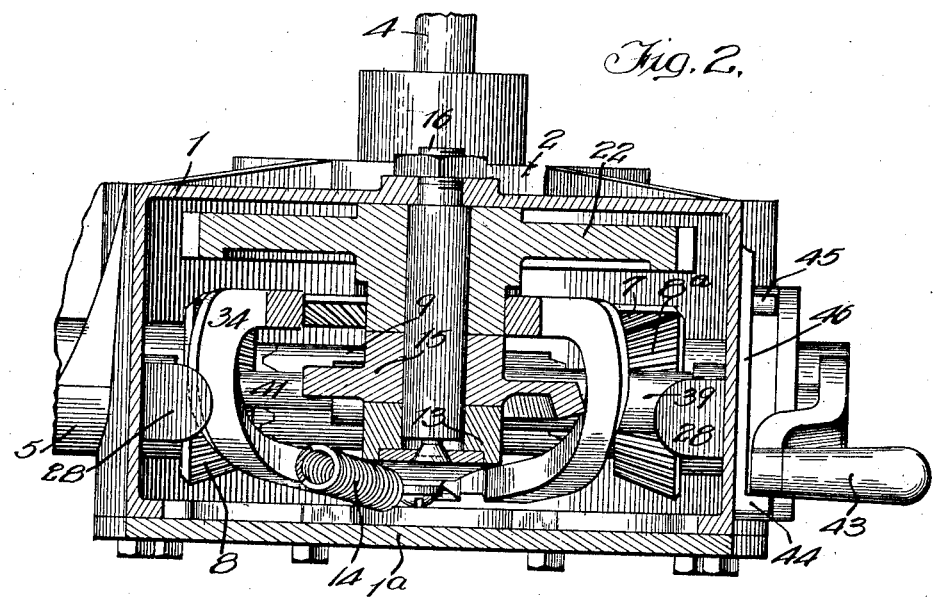
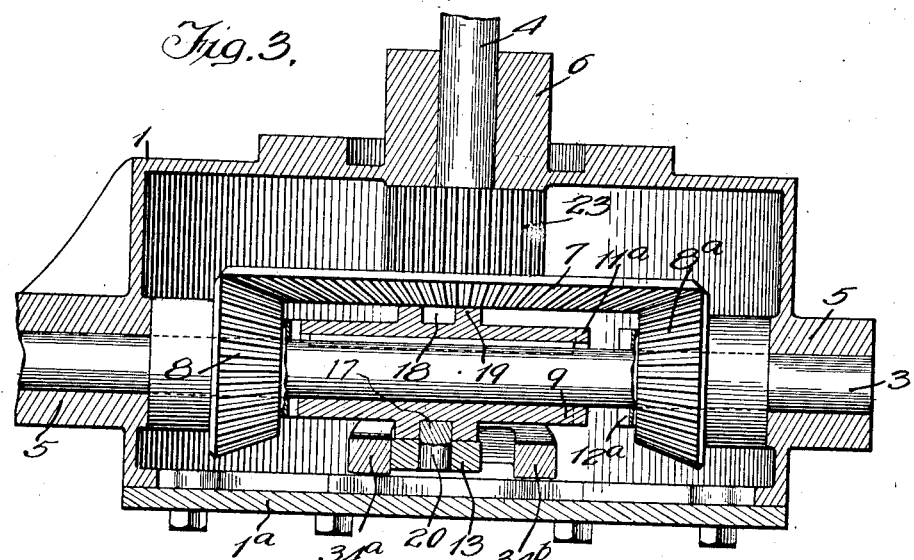

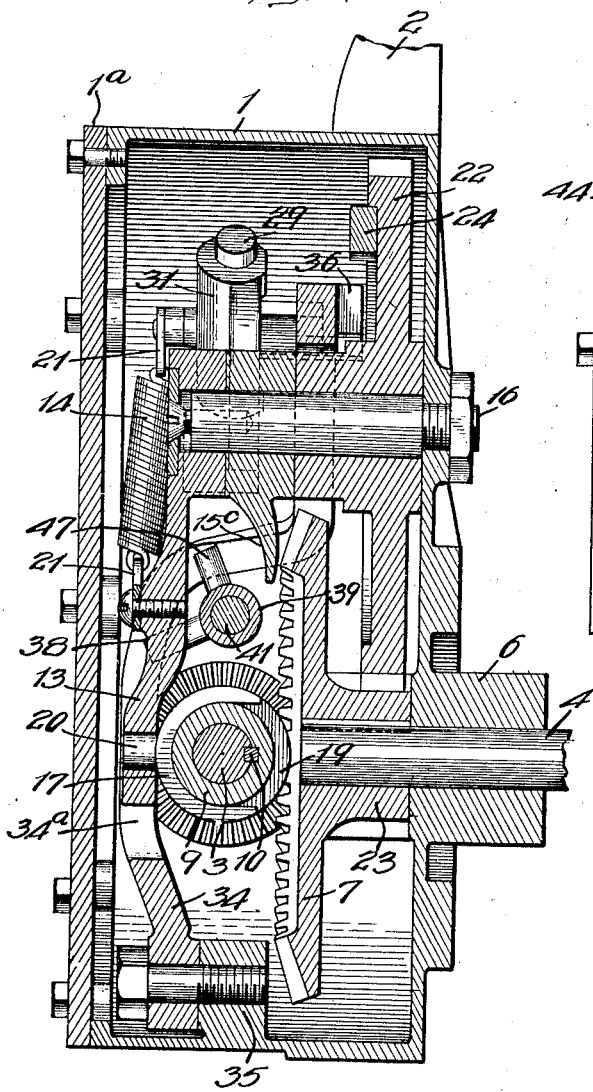

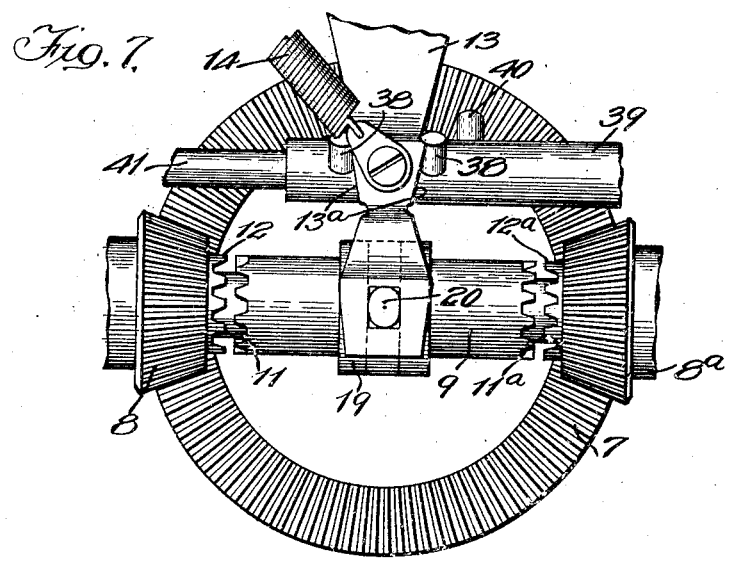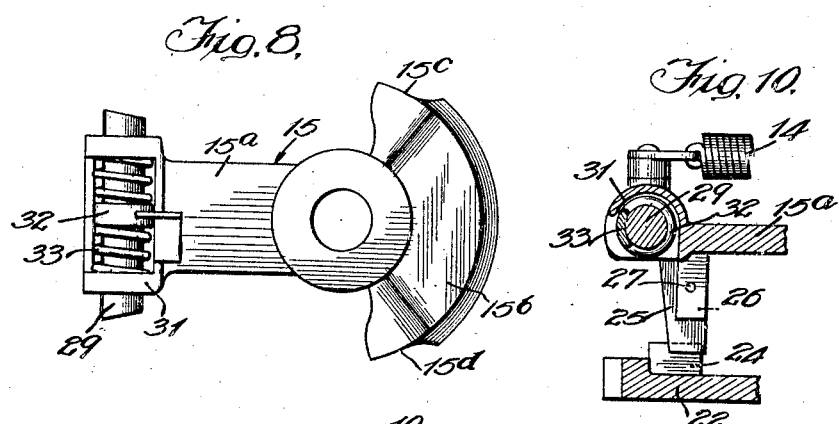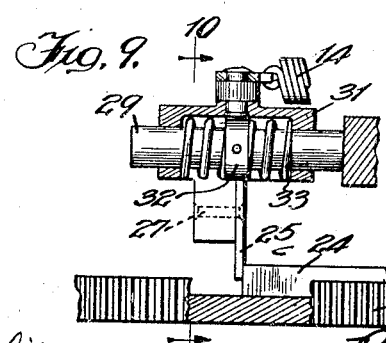

UNITED STATES PATENT OFFICE.

ROBERT S. CORLETT, OF EVANSTON, ILLINOIS, ASSIGNOR, BY MESNE ASSIGNMENTS, TO EDWARD E. BERTHOLD AND GUSTAVE W. BERTHOLD, BOTH OF CHICAGO, ILLINOIS, DOING BUSINESS AS BERTHOLD ELECTRICAL MFG. CO.

AUTOMATIC REVERSING MECHANISM.

1,358,295. Specification of Letters Patent. Patented Nov. 9, 1920.

Application filed July 1, 1918. Serial No. 242,695.

*To all whom it may concern:*

Be it known that I, ROBERT S. CORLETT, a citizen of the United States, residing at Evanston, in the county of Cook and State of Illinois, have invented certain new and useful Improvements in Automatic Reversing Mechanisms, of which the following is a specification.

The invention relates to automatic reversing mechanism adapted for use where it is desired to alternately actuate a rotary element as, for example, the cylinder or drum of a washing machine, a number of revolutions in opposite directions; and the general object of the invention is to provide improved mechanism of the type indicated which is of advantageous construction and which is positive, and hence efficient, in operation.

More specifically, one object of the invention is to provide improved means for tensioning the reversing spring so that at the proper time it will exert such a force upon the shiftable clutch element as to practically eliminate all danger of the clutch element sticking in neutral position.

A further object of the invention is to provide, in combination with such spring-tensioning means, positively actuated devices as distinguished from spring means, for disengaging the shiftable clutch element from its coacting elements.

A further object of the invention is to provide means for locking the shiftable clutch element in neutral or inoperative position.

Still another object of the invention is to provide means for preventing the locking of the clutch element in its inoperative position, except when the actuating spring is in position to return such element, when released, into engagement with one of its coacting elements.

The objects of the invention thus generally stated, together with other and ancillary advantages, are attained by the construction and arrangement illustrated in the accompanying drawings forming part hereof, in which Figure 1 is a fragmentary front elevation of a preferred embodiment of my invention with the cover plate of the housing removed. Fig. 2 is a horizontal sectional view through the same taken on line 2—2 of Fig. 1. Fig. 3 is a similar view taken on line 3—3 of Fig. 1. Fig. 4 is a vertical sectional view taken on line 4—4 of Fig. 1. Fig. 5 is a fragmentary side elevation showing part of the means for locking the shiftable clutch element in neutral position. Fig. 6 is a fragmentary sectional view taken on line 6—6 of Fig. 1 showing details of construction. Fig. 7 is a fragmentary front view of a portion of the reversing mechanism showing the shiftable clutch element locked in neutral position. Fig. 8 is a rear side view of a rocker forming part of the spring-tensioning means. Fig. 9 is a fragmentary sectional view taken on line 9—9 of Fig. 1 but with the parts in a slightly different position. Fig. 10 is a fragmentary sectional view taken on line 10—10 of Fig. 9.

The reversing mechanism is preferably mounted within a housing 1 formed on a supporting bracket 2 and arranged to be closed by a cover plate $1^a$. 3 is a drive shaft extending horizontally through the lower portion of the housing, while 4 is a shaft to be driven and may form one of the journals of a washing machine drum (not shown). Suitable bearings 5 are provided in the opposite side walls of the housing 1 for the drive shaft 3, and a bearing 6 is provided in the rear wall of the housing for the driven shaft 4. The driven shaft 4 extends into the housing and has fixed thereon a bevel gear 7 which meshes at all times at diametrically opposite points with two bevel pinions 8 and $8^a$ rotatably but non-slidably mounted within the housing on the drive shaft 3. Said pinions are arranged to be alternately driven from the drive shaft 3 through a shiftable clutch element or sleeve 9, splined upon the shaft 3 by means of a key 10 and having on its opposite ends clutch faces 11 and $11^a$. The pinions 8 and $8^a$ are also provided with clutch faces 12 and $12^a$, and means are provided for shifting the clutch sleeve to move the clutch faces 11 and $11^a$ thereon into and out of engagement with the clutch faces 12 and $12^a$.

The means for shifting the clutch sleeve 9 to alternately connect with the pinions 8 and $8^a$, whereby to rotate the bevel gear 7 alternately in the opposite directions, comprises a pivotally mounted lever 13 connected by means of a spring 14 with the free end of an oscillatory element or rocker 15. Said lever is also connected with the clutch sleeve 9 so that when the rocker is oscillated the clutch sleeve is shifted from engagement with one bevel pinion 8 or $8^a$ to the other.

The lever 13 is pivoted at its upper end upon the forward end of a stud shaft 16 suitably supported in the rear wall of the housing 1, while the lower end of the lever is connected to the sleeve 9 by means of a U-shaped member 17 (Figs. 3 and 4). Said member is operable in an annular groove 18 formed on the sleeve by means of a pair of annular flanges 19, and a pivot stud 20 on the member serves to connect the lever thereto.

The spring 14 is preferably a coiled tension spring and its opposite ends are connected as by means of pivoted ears 21 to the central portion of the lever 13 and the free end of an arm $15^a$ of the rocker 15. Said rocker is also mounted on the stud shaft 16.

It will be seen that when the rocker is oscillated to swing the free end of the arm $15^a$ of the rocker 15 from one side of its pivot to the other, the direction of pull of the spring 14 will be correspondingly changed, and in thus changing from one position to the other the arm serves to tension the spring to cause it to exert substantially its full force upon the lever 13, whereby to cause it to shift the clutch sleeve 9. The means for thus oscillating the rocker 15 comprises a rotary element such as a spur gear 22 mounted on the stud shaft 16 and adapted to be driven by a spur pinion 23 which may be formed integral with the bevel gear 7 on the driven shaft 4. Said spur gear has an arcuate member 24 secured on its forward face and forming a projection arranged to engage with a projection in the form of a plate or rib 25 protruding rearwardly from the free end of the arm $15^a$ and secured to a lug 26 as by means of a screw 27.

In the operation of the mechanism the spur gear is rotated in either one direction or the other by the drive shaft 3 according to the position of the clutch sleeve. In such rotation, either one end or the other of the arcuate member 24 engages with one side or the other of the rib 25 and rotates the rocker-arm $15^a$ to tension the spring as the direction of pull thereof is changed. The spring then acts to swing the lever 13 and thereby shift the clutch sleeve 9 to change the direction of rotation of the driven element. The extent of swinging movement of the rocker in opposite directions is limited by means of a pair of lugs or abutments 28 formed one on each side of the housing 1 (Fig. 1), and preferably the free end of the arm $15^a$ carries means for cushioning the impact thereof upon said abutments. As shown in Figs. 8 to 10, such means may comprise a rod 29 extending transversely through a hollow enlargement 31 on the free end of the arm and having a central collar 32 between which and the inner end walls of the enlargement a pair of springs 33 bear.

In order to insure that the clutch sleeve 9 will be shifted at the proper time, to reverse the mechanism, I have provided means actuated independently of the spring 14 for positively disengaging the clutch sleeve from the pinions 8 and $8^a$. Herein such means comprises a pivoted frame 34 disposed longitudinally in the housing 1 and arranged to be swung, as the direction of pull of the spring 14 is being changed, to disengage the clutch sleeve from the pinion with which it is engaged. Said frame is pivoted at its lower end to the housing 1 upon an upstanding rib 35 and at its upper end is provided with a rearwardly projecting lug 36 disposed in the path of movement of a screw 37 (Fig. 6) carried by the spur gear 22 and projecting forwardly therefrom.

Between its ends, the frame is connected with the sleeve 9. Herein such connection is effected by utilizing the connection of the lever 13 with the sleeve, and to this end the frame has opposite side rails $34^a$ and $34^b$ disposed on opposite sides of the lower end of the lever 13 so as to straddle the same. Thus, when the frame is swung, either one or the other of its rails will engage with the lever, whereby to impart an initial movement to the sleeve sufficient to disengage it from one or the other of the pinions 8 and $8^a$. The screw 37 is so located with reference to the ends of the arcuate members 24 that when the rocker 15 is oscillated, in the rotation of the spur gear in either direction, the screw will strike the lug 36 a sharp blow after the free end of the arm $15^a$ has passed dead center in the operation of tensioning the spring 14 and changing the direction of pull thereof upon the lever 13. Thus it will be seen that the initial movement of the clutch sleeve is positively accomplished, and that after such disengagement has been effected, the free end of the arm $15^a$ is in such position that the spring 14 is substantially at its maximum tension, when it exerts its strength upon the lever 13 to complete the shifting operation. Preferably, the frame is made of such size that its side rails $34^a$ and $34^b$ are spaced apart a sufficient distance greater than the width of the lower end of the lever 13 to permit the final movement of the clutch sleeve by the spring to be accomplished without moving the frame.

The means for locking the clutch sleeve 9 in neutral or inoperative position comprises a pair of pins 38 movable into engagement with cam faces $13^a$ on the lever 13 to move the lever and thereby the clutch sleeve 9 from engagement with either of the pinions 8 or 8ᵃ into inoperative position. Said pins 38 are mounted upon a sleeve 39 fixed, as by means of a pin 40, upon a shaft 41 extending transversely through the housing 1. Said shaft is mounted in suitable bearings 42 in the opposite side walls of the housing and one end thereof extends through the housing and is provided with a hand crank 43. The pins 38 and the cam surfaces 13ᵃ are so arranged that an operation of the crank 43 rearwardly (Fig. 1) will move the lever 13 into substantially vertical position (Fig. 7), or into its "off" position (Fig. 5). Preferably stops 44 and 45 are provided on an arcuate member 46 on the side of the casing 1 to facilitate the operation of locking and unlocking the clutch sleeve.

It will be seen that when the crank 43 is moved to release the lever 13, the spring 14 acts on said lever to shift the clutch sleeve into engagement with either of the pinions 8 or 8ᵃ. In order to insure that the rocker 15 will always be in position to cause the spring to shift the lever in either one direction or the other when the crank is moved into "on" position, I have provided the rocker with an arcuate portion 15ᵇ. The opposite ends of said portion 15ᵇ are provided with recesses 15ᶜ and 15ᵈ, and on the sleeve 39 is a pin 47 which, when the pins 38 are moved rearwardly (Fig. 4) to swing the lever 13, also moves rearwardly. The recesses 15ᶜ and 15ᵈ, however, are arranged to permit such rearward movement of the pin 47 only when the rocker-arm is at one extreme or the other of its movement at one side or the other of dead center. If the operator attempts, when the rocker arm is in dead center, to operate the pins 38 to swing the lever and thereby the clutch sleeve into inoperative position, the pin 47 will engage with the forward surface of the arcuate portion 15ᵇ of the rocker between the recesses 15ᶜ and 15ᵈ. It will be apparent that the rearward movement of the pins 38 is prevented until the parts reach a position in which the free end of the rocker is at either end of its movement. Thus, when it is desired to set the mechanism in operation after it has been stopped, the spring 14 will certainly be in position to move the clutch sleeve into engagement with one of the pinions 8 or 8ᵃ.

The operation of the mechanism may be summarized as follows: Assuming the hand crank 43 to be in the "on" position, as shown, with the clutch sleeve 9 in engagement with the pinion 8, power is applied to the driving shaft 3 to rotate the spur gear 22, through the bevel gear 7 and spur pinion 23, in a clockwise direction. During this rotation of the spur gear, the driven shaft 4 rotates a number of revolutions in one direction and at the same time the rocker 15 is oscillated to tension the spring 14 and to change the direction of pull thereof upon the shifting lever 13, such oscillation of the rocker being accomplished by the member 24 on the forward face of the spur gear engaging with the rib 25 on the rear side of the rocker arm 15ᵃ. When the free end of the arm 15ᵃ has been moved past dead center, the screw 37 on the forward face of the spur gear engages with the lug 36 on the rear surface of the frame 34. Thereupon the frame is swung on its pivot and its side rail 34ᵃ moves the lower end of the lever 13 and thereby the clutch face 11 of the sleeve 9 out of engagement with the clutch face 12 of the pinion 8. By this time the direction of pull of the spring 14 has been changed and the tension thereof increased, by the movement of the rocker, so that the spring acts immediately upon the lever 13 to complete the movement of the clutch sleeve into engagement with the clutch face 12ᵃ of the pinion 8ᵃ, for a cycle of operation in the opposite direction.

If it is desired to lock the sleeve in neutral or inoperative position so that the drive shaft may continue to operate without rotating the driven shaft, as, for example, when it is desired to operate a wringer independently of a washing machine, it is only necessary to move the crank 43 into the "off" position. This operation of the crank moves the pins 38 into engagement with the cam surfaces 13ᵃ on the lever 13 and thus swings the lever and the clutch sleeve into inoperative position. Such movement of the crank 43, however, is possible only when the rocker 15 is in position to cause the spring 14 to act upon the lever 13, in which position the pin 47 which has moved with the pins 38 is permitted to enter one of the recesses 15ᶜ or 15ᵈ on the opposite ends of the arcuate portion 15ᵇ of the rocker.

It will be seen that I have provided an automatic reversing mechanism of a very practical character. The means for positively disengaging the shiftable clutch element from engagement with its coacting elements, combined with the means for tensioning the actuating spring and the means for preventing the locking of the clutch element in inoperative position at a time when the actuating spring is disabled, practically insures that the mechanism may be operated at all times in either one direction or the other.

I claim as my invention:

1. An automatic reversing mechanism having, in combination, a driven element, a clutch member, a coiled tension spring operatively connected with said clutch member, means operable by said driven element to change the direction of pull of the spring, and means operable by said driven element independently of the last mentioned means to initially shift the clutch member.

2. An automatic reversing mechanism having, in combination with a drive shaft and a clutch member on the drive shaft, a rotary element uniformly driven from said drive shaft while said clutch is engaged, a lever pivoted coaxially with said rotary element, a spring for actuating said lever and means operable by said rotary element for tensioning the spring and changing the direction of exertion thereof.

3. An automatic reversing mechanism having, in combination, a drive shaft, a driven shaft and a countershaft, a reversing clutch on said drive shaft, a lever pivoted on said countershaft for controlling said reversing clutch, a rocker arm pivoted on said countershaft, a tension spring connecting said lever and said arm, a rotatable member on said countershaft adapted to be uniformly actuated by movement of said driven shaft, and a lost motion connection between said rotatable member and said rocker arm.

4. An automatic reversing mechanism having, in combination, a drive shaft, a driven shaft and a countershaft, a reversing clutch on said drive shaft, a lever pivoted on said countershaft and at its end engaging said clutch for actuating the same, a rocker arm pivoted on said countershaft, a tension spring connecting the free ends of said rocker arm and said lever, a rotatable member on said countershaft adapted to be uniformly actuated by said driven shaft, a lost motion connection between said rotatable member and said rocker arm, a pivoted forked frame straddling the end of said lever, and a lost motion connection between the free end of said forked frame and said rotatable member.

5. An automatic reversing mechanism having, in combination with a drive shaft and a clutch member, a driven element, a pivoted member arranged to be operated by said driven element to initially shift the clutch member, and means including a pivoted lever and a spring operatively associated with said driven element to complete the movement of said clutch member.

6. An automatic reversing mechanism having, in combination with a drive shaft and a clutch member, a driven element, means including a spring and a pivoted lever operatively associated with said element for automatically shifting the clutch member to alternately actuate the driven element in opposite directions, and a pivoted frame adapted to be swung by said driven element and arranged to engage with the free end of said lever whereby to initially shift the clutch member.

7. An automatic reversing mechanism having, in combination with a drive shaft and a clutch member, a driven element, a pivoted lever, a pivoted arm, a spring connecting the free end of said arm with said lever, said element having a projection thereon arranged to engage with said arm to move it and thereby change the direction of exertion of said spring, and a pivoted frame having portions adapted to engage said lever, said driven element having a projection thereon adapted to engage with said frame to move it and thereby said lever and the clutch member.

8. An automatic reversing mechanism having, in combination, a clutch member, and means for shifting said clutch member including a lever, a frame having portions adapted to straddle said lever, and a spring operatively associated with said lever.

9. An automatic reversing mechanism having, in combination, a clutch member, a driven element, means for shifting said clutch member to alternately actuate said driven element in opposite directions, said means including a lever connected with said clutch member, means for locking said lever and thereby said clutch member in inoperative position, a spring arranged to actuate said lever when released by said locking means, and positively acting means for assisting the initial action of said spring.

10. An automatic reversing mechanism having, in combination, a clutch member, a driven element, means for shifting said clutch member to alternately actuate said element in opposite directions, said means including a lever connected with said clutch member, and manually operable means having a cam engagement with said lever whereby to move it and thereby the clutch member into inoperative position.

11. An automatic reversing mechanism having, in combination, a drive shaft, a driven element, a clutch member on said shaft, a lever operatively connected with said clutch member, a spring for actuating said lever, means actuated by said driven element to tension the spring and change the direction of pull thereof, cam means for locking said lever and thereby the clutch member in inoperative position, and means for preventing the operation of said locking means except when the spring is in position to exert its force upon the lever to move it.

12. An automatic reversing mechanism having, in combination, a drive shaft, a driven element, a clutch member on said shaft, a lever operatively connected with said clutch member, a rocker, a spring connecting said rocker with said lever, means operable by said driven element for moving said rocker to change the direction of pull of said spring, a pair of rotatably mounted pins adapted to straddle said lever and operable to move it and thereby the clutch member into inoperative position, and a third pin movable with said pair of pins and adapted to engage with said rocker to prevent a movement of said lever by said pair of pins except when the rocker is in position to cause the spring to act.

13. An automatic reversing mechanism having, in combination, a drive shaft, a driven element, a clutch member on said shaft, means for shifting the clutch member including a spring, and a rocker operable to change the direction of pull of said spring, means for locking the clutch member in inoperative position, and a part movable with said locking means, said rocker having a portion with a pair of recesses therein arranged to receive said part whereby to permit the locking means to operate only when the rocker is in position to cause the spring to act in one direction or the other.

In testimony whereof, I have hereunto set my hand.

ROBERT S. CORLETT.